United States Patent
Lin et al.

(10) Patent No.: US 9,926,440 B2
(45) Date of Patent: Mar. 27, 2018

(54) ADDITIVES FOR RUBBER COMPOSITIONS

(71) Applicant: ARIZONA CHEMICAL COMPANY, LLC, Jacksonville, FL (US)

(72) Inventors: Chenchy Jeffrey Lin, Lancaster, SC (US); Godefridus J. H. Buisman, Savannah, GA (US); Yubin Wu, Shanghai (CN)

(73) Assignee: Arizona Chemical Company, LLC, Jacksonville, FL (US)

( * ) Notice: Subject to any disclaimer, the term of this patent is extended or adjusted under 35 U.S.C. 154(b) by 0 days.

(21) Appl. No.: 14/897,673

(22) PCT Filed: Dec. 18, 2014

(86) PCT No.: PCT/US2014/071145
§ 371 (c)(1),
(2) Date: Dec. 11, 2015

(87) PCT Pub. No.: WO2015/077800
PCT Pub. Date: May 28, 2015

(65) Prior Publication Data
US 2016/0251503 A1  Sep. 1, 2016

Related U.S. Application Data

(60) Provisional application No. 61/906,968, filed on Nov. 21, 2013.

(51) Int. Cl.
| | |
|---|---|
| *C08L 9/06* | (2006.01) |
| *C08K 3/36* | (2006.01) |
| *C08K 5/09* | (2006.01) |
| *C08K 5/548* | (2006.01) |
| *C08L 21/00* | (2006.01) |
| *B60C 1/00* | (2006.01) |

(52) U.S. Cl.
CPC .............. *C08L 9/06* (2013.01); *B60C 1/0016* (2013.01); *C08K 3/36* (2013.01); *C08K 5/09* (2013.01); *C08K 5/548* (2013.01); *C08L 21/00* (2013.01)

(58) Field of Classification Search
CPC .......... C08L 9/06; C08L 21/00; B60C 1/0016; C08K 3/36; C08K 5/09; C08K 5/548
See application file for complete search history.

(56) References Cited

U.S. PATENT DOCUMENTS

| | | | |
|---|---|---|---|
| 4,373,041 A * | 2/1983 | Wood ..................... | C08K 5/548 524/270 |
| 5,504,152 A | 4/1996 | Schluenz et al. | |
| 5,985,953 A | 11/1999 | Lightsey et al. | |
| 7,312,271 B2 | 12/2007 | Chen et al. | |
| 7,560,583 B2 | 7/2009 | Chaves et al. | |
| 7,718,819 B2 | 5/2010 | Chaves et al. | |
| 7,737,204 B2 | 6/2010 | Sandstrom | |
| 7,928,157 B2 | 4/2011 | Sandstrom et al. | |
| 8,008,519 B2 | 8/2011 | Chaves et al. | |
| 8,013,178 B2 | 9/2011 | Klockmann et al. | |
| 8,158,812 B2 | 4/2012 | Chaves et al. | |
| 8,288,474 B2 | 10/2012 | Hergenrother et al. | |
| 8,609,877 B2 | 12/2013 | Cruse et al. | |
| 2006/0161015 A1 | 7/2006 | Klockmann et al. | |
| 2007/0056139 A1 | 3/2007 | Lee et al. | |
| 2008/0066838 A1* | 3/2008 | Zhang ................... | B60C 1/0016 152/209.4 |
| 2009/0069474 A1 | 3/2009 | Sandstrom et al. | |
| 2009/0209690 A1* | 8/2009 | Sandstrom ............ | B60C 1/0008 524/274 |
| 2010/0224301 A1* | 9/2010 | Sakamoto ............... | C08L 15/00 152/547 |
| 2010/0324168 A1* | 12/2010 | Takizawa .................. | C08L 9/06 523/150 |
| 2011/0297285 A1 | 12/2011 | Pille-Wolf et al. | |
| 2014/0256847 A1 | 9/2014 | Sato et al. | |
| 2016/0251503 A1 | 9/2016 | Chenchy et al. | |

FOREIGN PATENT DOCUMENTS

| | | | |
|---|---|---|---|
| CN | 103946299 A | | 7/2014 |
| EP | 2558308 B1 | | 6/2014 |
| EP | 2772511 A1 | | 9/2014 |
| JP | 2005-047973 | * | 2/2005 |
| JP | 2005-248056 | * | 9/2005 |
| JP | 2006249069 A | | 9/2006 |
| JP | 2007-231085 | | 9/2007 |
| JP | 2010-168491 | | 8/2010 |
| JP | 2011-006514 | | 1/2011 |
| JP | 2011-057892 | | 3/2011 |
| JP | 4921625 B2 | | 4/2012 |
| KR | 20060084812 A | | 7/2006 |
| WO | 2012/043857 A1 | | 4/2012 |
| WO | 2013/077020 A1 | | 5/2013 |

* cited by examiner

*Primary Examiner* — Robert Jones, Jr.
(74) *Attorney, Agent, or Firm* — Samantha Page; Cantor Colburn LLP

(57) ABSTRACT

The instant invention relates to rubber compositions comprising silica, an organomercaptosilane having a bulky group and/or a polyether group bound to the silicon atom and a rosin-containing material. The instant invention also relates to tires comprising such rubber compositions, to methods of preparation of such rubber compositions or tires thereof, and to the use of rosin-containing materials for improving the Mooney viscosity and mechanical properties of rubbers comprising the same (e.g. in a tire).

25 Claims, No Drawings

ADDITIVES FOR RUBBER COMPOSITIONS

The instant invention relates to rubber compositions comprising silica, an organomercaptosilane, in particular an organomercaptosilane having a bulky group and/or a polyether group bound to the silicon atom, and a rosin-containing material. The instant invention also relates to tires comprising such rubber compositions, to methods of preparation of such rubber compositions or tires thereof, and to the use of rosin-containing materials for improving the Mooney viscosity and mechanical properties of rubbers comprising the same (e.g. in a tire).

Silanes have been used in rubber compositions as adhesion promoters, as cross-linking agents and as surface-modifying agents. Reference is made to, e.g, E. P. Plueddemann, "Silane Coupling Agents", 2nd ed. Plenum Press 1982).

Several commonly used silanes include alkoxy silanes such as aminoalkyltrialkoxysilanes, methacryloxyalkyltrialkoxysilanes, polysulfanalkyltrialkoxysilanes and mercaptoalkyltrialkoxysilanes. For instance, US 2009/0209690 describes the use of alkoxysilane-based coupling agents containing a polysulfide bridge, in combination with the use of decarboxylated rosin.

It has now been found that the use of rosin-containing materials in combination with specific types of organomercaptosilanes, i.e. organomercaptosilanes having at least one bulky group and/or at least one polyether group bound to the silicon atom, leads to rubber compositions with improved properties.

In particular, rosin-containing materials have been found to improve the Mooney viscosity and mechanical properties of rubber compositions comprising silica and organomercaptosilanes comprising a bulky group and/or a polyether group. Rosin-containing materials have also been found to have a negligible effect on the rolling resistance of products, such as tires, comprising said rubber compositions.

Accordingly, rubber compositions as described herein advantageously improve the manufacture and the properties of said rubber compositions and of products comprising the same.

Organomercaptosilanes as described herein are distinct from other organomercaptosilanes, and in particular from commonly used alkoxy substituted organomercaptosilanes, in the groups that are bound to the silicon atom. Organomercaptosilanes as described herein have a one bulky group and/or a polyether group bound to the silicon atom.

In several embodiments, organomercaptosilanes as described herein have at least one bulky group bound to the silicon atom. A bulky group as described herein may generally refer to a group having at least 20 atoms including carbon atoms and, optionally, heteroatoms, the atom count not taking into account any hydrogen atoms present in the bulky group. Herein, organomercaptosilanes with such bulky groups will be referred to as bulky organomercaptosilanes.

In several embodiments, organomercaptosilanes as described herein have at least one polyether group (which may also be referred to as alkoxylated alkoxy group) bound to the silicon atom. The polyether group is generally bound to the silicon atom via an oxygen atom. Polyether groups as described herein generally are groups of the formula —O—(R'—O)m-R", wherein, for instance, R' is an divalent hydrocarbon, R" is a monovalent hydrocarbon and m is at least 1. Organomercaptosilanes having at least one polyether group as described herein may be referred to as alkoxylated alkoxy organomeraptosilanes.

In several embodiments, organomercaptosilanes as described herein have at least one bulky group and at least one polyether group bound to the silicon atom. In several particular embodiments the organomercaptosilanes have at least one group bound to the silicon atom which is both a bulky group and a polyether group as defined herein.

Such groups confer different properties to organomercaptosilanes and to rubber compositions comprising the same than other commonly used organomercaptosilanes. For instance, organomercaptosilanes having bulky groups and/or polyether groups, have different kinetic behaviour when compared to organomercaptosilanes having small alkoxy groups.

Without being bound to any theory, the bulky groups and/or polyether groups bound to the silicon atom are expected to play an important role in the reaction mechanism between the silane and the silanol group of the silica. Reference is made, e.g., to the publication "Kinetics of the Silica-Silane Reaction" in Kautschuk Gummi Kunststoffe (KGK) of April 2011 (pp. 38-43) by A. Blume.

Examples of the use of rosin derivatives in rubber compositions include for instance those described in US 2009/0209690 and US 2009/069474.

US 2009/0209690 describes rubber compositions which contain a combination of silica reinforcement and plant-derived liquid partially decarboxylated rosin. This document describes that numerous coupling agents may be used for coupling silica, chiefly polysulfanes (e.g. containing polysulfide bridge), and generally mentions organomercaptoalkoxysilanes, without describing their structure. Actually this patent excludes the use of rosin with typical acid numbers around 160 mg KOH/g and claims the use of decarboxylated rosin oils with typical acid numbers between 2 and 30 mg KOH/g.

US 2009/069474 describes a tire with a tread of a rubber composition which contains zinc resinate within and on the surface of said rubber composition. A number of coupling agents are described to be used in conjunction with silica. Organoalkoxymercaptosilanes are mentioned alongside polysulfanes such as bis-(3-trialkoxysilylalkyl)polysulfides.

The use of rosin-containing materials in combination with organomercaptosilanes having bulky groups and/or polyether groups in silica-containing rubber compositions has not been described. Also, the benefits of the use of rosin-containing materials in combination with organomercaptosilanes as described herein, in particular with respect to improvements of Mooney viscosity and the green mechanical properties of rubber compositions comprising the same, have neither been described nor suggested.

Accordingly, in several aspects the instant invention relates to a rubber composition comprising a rubber, silica, an organomercaptosilane having a bulky group and/or a polyether group bound to the silicon atom, and a rosin-containing material.

A rosin-containing material is a composition which comprises a rosin compound, and generally comprises a mixture of rosin compounds. Herein a rosin compound means a rosin acid or a compound derived from a rosin acid. A compound derived from a rosin acid is a compound obtained by subjecting a material comprising a rosin acid to, e.g., at least one of a dimerization reaction, a hydrogenation reaction, disproportionation reaction, a decarboxylation reaction and a esterification reaction.

A rosin-containing material in rubber compositions as described herein is selected from rosin, dimerized rosin, hydrogenated rosin, disproportionated rosin, decarboxylated rosin and rosin ester. In several embodiments the rosin-containing material is selected from rosin, dimerized rosin, hydrogenated rosin, and disproportionated rosin. In several embodiments, the rosin-containing material is a rosin, in particular is a rosin selected from tall oil rosin, gum rosin, wood rosin, and more in particular may be tall oil rosin.

Rosin is a resinous material that is obtained from many plants, particularly coniferous trees such as *Pinus Sylvestris*, *Pinus palustris* and *Pinus caribaea*. Rosin comprises a mixture of rosin acids, which generally include $C_{20}$ fused-ring monocarboxylic acids, with a nucleus of three fused six-carbon rings and double bonds that vary in number and location, and other components in minor quantities. Examples of rosin acids include abietic acid, neoabietic acid, dehydroabietic acid, pimaric acid, levopimaric acid, sandaracopimaric acid, isopimaric acid and palustric acid. The type and relative amounts of rosin acids present in rosin depend, in part, on the plant species and the process of production.

Rosin can be obtained from pine trees by distillation of oleoresin (the residue of said distillation is known as "gum rosin"), by extraction of pine stumps (known as "wood rosin") or by fractionation of tall oil (known as "tall oil rosin"). Tall oil rosin may be particularly used. Other rosin-containing materials obtained during the production of tall oil rosin such as distilled tall oil (DTO), tall oil fatty acid (TOFA) and crude tall oil (CTO) may also be used. All of these sources of rosin are examples of rosin-containing materials suitable for use in the compositions and methods described herein which are known in the art and are commercially available. Sources of rosin may contain major components other than rosin acids. In particular DTO, CTO and TOFA are mixtures of fatty acids and rosin acids, i.e. comprising fatty acids as major components in addition to rosin acids. The composition of DTO and CTO is described in more detail below.

Each of the terms "dimerized rosin", "hydrogenated rosin", "disproportionated rosin" and "decarboxylated rosin" refers to rosin (i.e. a mixture of rosin acids as defined above), which has been subjected to a dimerization reaction, a hydrogenation reaction, disproportionation and a decarboxylation reaction respectively. The production of these types of rosin-containing material is known in the art.

The term "rosin ester" refers to an ester of rosin (i.e. a mixture of rosin acids as defined above) and at least one alcohol.

Suitable alcohols for esterification include mono-alcohols, such as methanol, ethanol, butanol, C8-11 isoalcohols (such as isodecylalcohol and 2-ethylhexanol), and polyols such as diethylene glycol, triethylene glycol, glycerol, pentaerythritol, sorbitol, neopentyl glycol and trimethylolpropane. In particular, useful alcohols include diethylene glycol, triethylene glycol and pentaerythritol. Rosin esters may be obtained from rosin and alcohols by methods known in the art. For example, reference is made to the processes described in the patent document U.S. Pat. No. 5,504,152, which is incorporated herein by reference. In general, rosins may be esterified by a thermal reaction of rosin acids contained therein with an alcohol (i.e. one or more alcohols). In order to drive such esterification reactions to completion water may be removed from the reactor, by, for instance, distillation, application of vacuum, and other methods known to the skilled person.

The rosin-containing material may generally comprise from 1 wt. % to 99.99 wt. % of rosin compounds. In particular, the rosin-containing material may comprise from 5 wt. % to 95 wt. % of rosin compounds, more in particular from 10 wt. % to 80 wt. % and even more in particular from 25 wt. % to 65 wt. % of rosin compounds. The remaining of the rosin-containing material to 100 wt. % consists of components other than rosin compounds, including, for instance, fatty acids (e.g. stearic acid, oleic acid, linoleic acid, linolenic acid and pinolenic acid); high molecular weight alcohols (e.g. fatty alcohols and sterols); alkyl hydrocarbon derivates; residual terpene monomers such as α-pinene, β-pinene and other mono and bicyclic terpenes; other unsaponifiables; and trace metals.

The exact composition of rosin-containing materials may vary. For instance, the composition of wood rosin, gum rosin, tall oil rosin (TOR) distilled tall oil (DTO) and crude tall oil (CTO), may vary depending on the starting materials and processing steps used in their production. These will also influence the composition of rosin-containing materials derived therefrom (e.g. dimerized rosin, hydrogenated rosin, disproportionated rosin, decarboxylated rosin and rosin ester).

A wood rosin may particularly comprise 75-99 wt. % (in particular 85-98 wt. %) of rosin acids, 2-5 wt. % of fatty acids, 2-10 wt. % of monoterpenes and diterpenes, and other components to a total of 100 wt. %, including, e.g., any of the additional components described above to be present in rosin, in particular, 4-8 wt. % of other acids and unsaponifiables.

A gum rosin may particularly comprise 75-99 wt. % (in particular 85-98 wt. %) of rosin acids, 2-5 wt. % of fatty acids, 2-10 wt. % of monoterpenes and diterpenes, and other components to a total of 100 wt %, including, e.g., any of the additional components as described above and, in particular, other acids and unsaponifiables.

A tall oil rosin may particularly comprise 75-99 wt. % (in particular 80-95 wt. %) of rosin acids, 2-10 wt. % of fatty acids, and other components to a total of 100 wt. %, including, e.g., any of the additional components as described above and, in particular, other acids and unsaponifiables.

A distilled tall oil may particularly comprise 10-40 wt. % of rosin acids, from 50 to 80 wt. % of fatty acids and other components to a total of 100 wt. % including, e.g., any of the additional components as described above and, in particular, unsaponifiables.

A crude tall oil may particularly comprise from 10 to 50 wt. % of rosin acids, from 40 to 70 wt. % of fatty acids, and other components to a total of 100 wt. %, including, e.g., any of the additional components as described above and, in particular, high molecular weight alcohols, sterols and unsaponifiables.

Rosin-containing materials as described herein may generally have an acid number from 0.5 to 210 mg KOH/g, in particular from 1 to 205 mg KOH/g, more in particular from 1.5 to 200 mg KOH/g, yet more in particular from 2 to 195 KOH/g. The acid number can be determined according to ASTM D465 using a standard titration with sodium hydroxide solution.

Rosin-containing materials as described herein may be viscous liquids or may be solids at room temperature. Viscous liquids may generally have Brookfield viscosities of at most 1500 cps, in particular of at most 1000 cps, and more in particular of at most 500 cps at 50° C., as measured by methods known in the art. Rosin-containing materials solid at room temperature may generally have a softening point from 40 to 170° C., in particular from 45 to 160° C., more in particular from 50 to 150° C., yet more in particular from 55 to 145° C. The softening point can be measured by the Ring and Ball method (ASTM E28-97), whereby a sample of the rosin-containing material is poured molten into a metal ring, and is subsequently cooled. The ring is cleaned in such a way that the rosin-containing material fills the ring, a steel ball is placed resting on top of the resin. The ring and ball are placed in a bracket which is lowered into a beaker containing a solvent (e.g. water, glycerol or silicone oil depending on the expected softening point), and the solvent is heated at 5° C. per minute while being stirred. When the ball drops completely through the ring, the temperature of the solvent is recorded as the Ring & Ball softening point.

The properties of rosin-containing materials may vary, and may depend on the specific type of rosin-containing material. For instance, rosins, dimerized rosins, hydrogenated rosins, disproportionated rosins, decarboxylated rosins and rosin esters, will generally have the properties described above for rosin-containing materials, in particular with respect to the amount of rosin compounds, acid number and softening points. However, specific compositions and properties may be obtained depending on the starting source of rosin, and specific preparation and reaction conditions.

Rosins may have an acid number from 125 to 190 mg KOH/g, in particular from 140 to 180 mg KOH/g, more in particular from 150 to 175 mg KOH/g and have a softening points from 40 to 80° C., in particular from 50 to 90° C., and more in particular from 60 to 75° C.

Dimerized rosins may particularly have an acid number from 120 to 190 mg KOH/g, in particular from 130 to 180 mg KOH/g, more in particular from 135 to 175 mg KOH/g and a softening point from 60 to 160° C., and in particular from 80 to 140° C.

Hydrogenated rosins may have an acid number from 140 to 180 mg/g KOH and a softening point from 40 to 80° C.

Disproportionated rosins may have an acid number from 130 to 180 mg KOH/g, in particular from 140 to 165 mg KOH/g, and a softening point from 40 to 90° C. and more in particular from 45 to 85° C.

Decarboxylated rosins may have an acid number from 10 to 175 mg KOH/g, in particular from 25 to 125 mg KOH/g, more in particular from 35 to 100 mg KOH/g. Generally, decarboxylated rosins are viscous liquids at room temperature and may particularly have a Brookfield viscosity of at most 1000 cps at 50° C., as measured by methods known in the art.

Rosin esters may have an acid number from 0.50 to 100 mg KOH/g, in particular from 1.0 to 80 mg KOH/g, more in particular from 1.5 to 75 mg KOH/g and a softening point from 80 to 130° C., in particular from 85 to 125° C. The softening point may vary depending on the polyalcohols used in the preparation of rosin esters and on whether rosin esters are further modified, by, e.g., dimerization and/or fortification with for example maleic anhydride or fumaric acid has been applied. Reference is made to, e.g., Naval Stores, F. Zinkel and J. Russel 1989, Chapter 9, pp 282-285.

Rosin-containing materials are generally present in rubber compositions as described herein in amounts from 0.001-75 parts per hundred parts of rubber (phr), in particular from 0.01 to 50 phr, more in particular from 0.1 to 25 phr, more in particular from 0.25 to 10 phr, and yet more in particular from 0.5 to 5.0 phr.

The term "parts per hundred parts of rubber" or "phr" is commonly used in the art of rubber compositions and refers to weight parts of a component present in a rubber composition per 100 parts by weight of rubber. The weight parts of rubber present in the composition is calculated on the total amount of rubber used as component (A). Hence, if more than one rubber is used, e.g. if a mixture of rubbers is used, the phr is calculated on the basis of the total weight amount of the rubber mixture.

The amount of rosin-containing material present in rubber compositions as described herein may be based on the amount of bulky and/or alkoxylated alkoxy organomercaptosilane also present therein. In particular, the amount of rosin-containing material may be from 1 to 100 wt. % based on the total weight amount of bulky and/or alkoxylated alkoxy organomercaptosilane, in particular from 2.5 to 75 wt. %, more in particular from 5 to 50 wt. %, even more in particular from 10 to 30 wt. %, yet more in particular from 15 to 25 wt. %.

A rubber composition as described herein may comprise any type of rubber selected from natural and synthetic rubbers, including solution polymerizable or emulsion polymerizable elastomers.

Suitable rubbers include polymers of at least one monomer selected from olefin monomers, including: monoolefins such as ethylene, propylene; conjugated diolefins such as isoprene and butadiene; triolefins; and aromatic vinyl's such as styrene and alpha methyl styrene.

Natural rubber is also known as India rubber or caoutchouc and comprises polymers of isoprene as its main component. Natural rubber is generally obtained from trees from the species *Hevea Brasiliensis*, from Guayule dandelion and Russian Dandelion.

Suitable synthetic rubbers are described, for example, in the book Kautschuktechnologie by W. Hofmann, published by Gentner Verlag, Stuttgart, 1980.

Solution and emulsion polymerization elastomers are well known to those of ordinary skill in the art. For example, conjugated diene monomers, monovinyl aromatic monomers, triene monomers, and the like, can be anionically polymerized to form, e.g., polymers, copolymers and terpolymers thereof.

In particular, suitable rubbers may be selected from at least one of natural rubber (NR), polybutadiene (BR), polyisoprene (IR), styrene/butadiene copolymers (SBR), styrene/isoprene copolymers (SIR), isobutylene/isoprene copolymers (HR also known as butyl rubber), ethylene acrylic rubber, ethylene vinyl acetate copolymers (EVA), acrylonitrile/butadiene copolymers (NBR), partly hydrogenated or completely hydrogenated NBR rubber (HNBR), ethylene/propylene rubber, ethylene/propylene/diene terpolymers (EPDM), styrene/isoprene/butadiene terpolymers (SIBR), chloroprene (CR), chlorinated polyethylene rubber, fluoroelastomers chlorosulfonated polyethylene rubbers, tetrafluoroethylene/propylene rubber, epichlorohydrin rubbers and silicone rubber.

Further, suitable rubbers include the above mentioned rubbers which additionally have functional groups, such as carboxyl groups, silanol groups, siloxy groups epoxide groups and amine groups. The functionalization of rubbers is well known in the art. Examples of functionalized rubbers include, for instance, epoxidized natural rubber, carboxy-functionalized NBR, silanol-functionalized (—SiOH)SBR or siloxy-functionalized (—Si—OR)SBR amine functionalized SBR. Such functional rubbers may react with the silica and silanes present in the rubber composition. However, non-functionalized rubbers may be particularly used.

In particular, rubbers may be selected from at least one of styrene/butadiene copolymer (SBR), polybutadiene (BR), natural rubber, polyisoprene, butadiene/isoprene copolymer (IIR), styrene/isoprene/butadiene terpolymer (SIBR), and isoprene/styrene copolymer; even more in particular from at least one of styrene/butadiene copolymer (SBR) polybutadiene (BR) and natural rubber.

A composition as described herein may comprise a mixture of two or more rubbers described above. In particular, component (A) of a composition as described herein may be a mixture of any one of styrene/butadiene copolymer (SBR), polybutadiene (BR), natural rubber, polyisoprene, butadiene/isoprene copolymer (IIR), styrene/isoprene/butadiene terpolymer (SIBR), isoprene/styrene copolymer and functionalized rubber. More in particular a rubber mixture may comprise at least two of styrene butadiene copolymer (SBR), polybutadiene (BR) and natural rubber.

Polybutadienes (BR) may be selected from high cis 1,4-polybutadiene and high vinyl polybutadiene. A high vinyl polybutadiene generally has a vinyl content from 30 to 99.9 wt. %, wherein the weight percentage (wt. %) is based on the total weight amount of polybutadiene. A high cis 1,4-polybutadiene may generally have a cis 1,4-butadiene content of 90-99.9 wt. % on the total weight amount of polybutadiene. In several embodiments, a polybutadiene may be a high cis 1,4-polybutadiene with 99.5 wt. % of cis 1,4-butadiene monomer.

Polyisoprenes (IR) may be cis 1,4-polyisoprene (natural and synthetic).

Styrene butadiene copolymers (SBR) may be derived from an aqueous emulsion polymerisation (E-SBR) or from an organic solution polymerisation (S-SBR), solution polymerized SBR may be particularly used. An example of a commercially available solution-polymerized SBR (oil extended) is Duradene™ from Firestone Polymer. A SBR (either E-SBR or S-SBR) may have styrene contents of from 1 to 60 wt. %, particularly from 5 to 50 wt. %, wherein the weight percentage (wt. %) is based on the total weight amount of SBR.

Acrylonitrile/butadiene copolymers (NBR) may have acrylonitrile contents of from 5 to 60, preferably 10 to 50 wt. %, wherein the weight percentage (wt. %) is based on the total weight amount of NBR.

Rubber compositions as described herein may comprise silica, which acts as reinforcing filler.

The silica may be selected from at least one of amorphous silica (such as precipitated silica), wet silica (i.e. hydrated silicic acid), dry silica (i.e. anhydrous silicic acid) and fumed silica (also known as pyrogenic silica). The silica can also be in the form of mixed oxides with other metal oxides, such as aluminum oxide, magnesium oxide, calcium oxide, barium oxide, zinc oxide and titanium oxide.

In several embodiments, the silica may be amorphous silica, such as precipitated silica.

Examples of suitable commercially available silicas include, but are not limited to, Hi-Sil™ (R) 190, Hi-Sil™ (R) 210, Hi-Sil™ (R) 215, Hi-Sil™ (R) 233, Hi-Sil™ (R) 243, and the like, from PPG Industries (Pittsburgh, Pa.); Ultrasil™ VN2, VN3, VN2 GR, VN3 GR, and highly dispersible silica Ultrasil™ 7000 GR, 9000GR from Evonik; Zeosil™ 1085GR, highly dispersible silica Zeosil™ 1115MP, 1115, 115GR, 1165 MP, and Zeosil™ Premium 200 from Solvay; and Zeopol™ 8745 and 8755 LS from Huber.

A silica may generally have a specific surface area (BET surface area) from 5 to 1000 $m^2/g$, in particular from 10 to 750 $m^2/g$, more in particular from 25 to 500 $m^2/g$, even more in particular from 50 to 250 $m^2/g$, and may generally have a particle size from 10 to 500 nm, in particular from 50 to 250 nm, more in particular from 75 to 150 nm. Methods of measuring silica surface area and particle size are well known in the art. In particular, the silica surface area may be measured by the commonly used BET method.

The pH of silica may generally be of about 5.5 to about 7 or slightly over, preferably about 5.5 to about 6.8.

A rubber composition as described herein may generally comprise silica in an amount from 5 to 150 phr, in particular from 25 to 130 phr, more in particular from 40 to 115 phr.

A rubber composition as described herein may comprise additional fillers other than silica, such as carbon black; metal hydroxides (e.g. aluminum hydroxide); silicates such as aluminum silicate, alkaline earth metal silicates (including magnesium silicate or calcium silicate), including mineral silicates such as clay (hydrous aluminum silicate), talc (hydrous magnesium silicate), mica and bentonite; carbonates (e.g. calcium carbonate); sulfates (e.g. calcium sulfate or sodium sulfate); metal oxides (e.g. titanium dioxide) and mixtures thereof.

In particular, a rubber composition as described herein may comprise both silica and carbon black or both silica and aluminum hydroxide as the filler.

When present, said additional fillers may be present in rubber compositions in amounts from 0.5 to 40 phr, in particular from 1 to 20 phr and, more in particular from 2.5 to about 10 phr. The amount of additional fillers may be chosen based on the amount of silica present in the rubber compositions as described above. The additional filler may be present in a weight ratio (additional filler to silica) from 70:30 to 1:99, more in particular from 50:50 to 10:90, more in particular from 40:60 to 20:80.

Rubber compositions as described herein comprise an organomercaptosilane having a bulky group and/or a polyether group bound to the silicon atom. In a preferred embodiment organomeracaptosilanes as described herein have at least one bulky group bound to the silicon atom, more preferably at least one bulky group and at least one polyether group bound to the silicon atom, and most preferably organomercaptosilanes as described herein have at least one group bound to the silicon atom which is both a bulky group and a polyether group, also referred to herein as a bulky polyether group.

In several embodiments, organomercaptosilanes as described herein may have two groups bound to the silicon atom selected from bulky groups and polyether groups as described herein, which may be the same or different. In several particular embodiments organomercaptosilanes as described herein may have two bulky polyether groups bound to the silicon atom.

As indicated above, a bulky group as described herein may generally refer to a group having at least 20 atoms including carbon atoms and, when present, heteroatoms, the atom count not taking into account any hydrogen atoms present in the bulky group. The total number of carbon atoms and, if any, heteroatoms may be at least 22, more in particular at least 24, more in particular at least 28. The maximal number of total carbon atoms and, if any, heteroatoms is not particularly limited. It may generally be at most 350, in particular at most 250, even more in particular at most 200, even more in particular at most 150, even more in particular at most 100, even more in particular at most 90, even more in particular at most 60, and even more in particular at most 30.

When present, the heteroatoms of the bulky group may be selected from oxygen, silicon, sulphur, nitrogen and halogen. In particular, the heteroatoms may be selected from at least one of oxygen, silicon and sulphur, and more in particular the heteroatoms may be oxygen.

The bulky group may be any group provided that the group has a total number of carbon atoms and heteroatoms as indicated above. For instance, the bulky group may be a R— group or a RO— group, wherein R is branched or linear monovalent or divalent alkyl, alkenyl, aryl or aralkyl group, which may or may not be substituted. When R is substituted it may have moieties comprising heteroatoms such as the above mentioned heteroatoms. In particular, the bulky group is a RO— group, more in particular the bulky RO— group is a polyether group.

In several embodiments, organomercaptosilanes as described herein have a polyether group (also referred to as alkoxylated alkoxy group) bound to the silicon atom. As explained above, the polyether group is generally bound to the silicon atom via an oxygen atom. Polyether groups as described herein are groups of the formula —O—(R'—O)m-R", wherein, for instance, R' is an divalent hydrocarbon, R" is a monovalent hydrocarbon and m is at least 1. Organomercaptosilanes having at least one polyether group as described herein may be referred to as alkoxylated alkoxy organomeraptosilanes.

Examples of such organomercaptosilanes having at least one polyether group attached to the silicon atom are described in, for instance, US 2006/0161015, which contents are incorporated herein by reference.

In several embodiments the polyether group is a bulky group as described above, namely comprising a number of carbon atoms and heteroatoms of at least 20. If the polyether group is a bulky group, the organomercaptosilane may preferably have a low alkoxy group (of 1-5 carbon atoms) bound to the silicon atom. If the polyether group is not a bulky group, at least one bulky group may preferably also be bound to the silicon atom of the organomercaptosilane.

A polyether group in organomercaptosilanes as described herein may be a group of the formula —O(R'—O)$_m$—R", wherein R' is identical or different when m>1 and is a branched or linear, saturated or unsaturated, aliphatic divalent C1-C30 hydrocarbon group, m is on average 1 to 30, and R" is an unsubstituted or substituted branched or linear monovalent alkyl, alkenyl, aryl or aralkyl group having at least 6 carbon atoms, in particular at least 9 carbon atoms, more in particular at least 11 carbon atoms and even more in particular at least 12 atoms.

In several embodiments, the polyether group may be a group of the formula —O(R'—O)$_m$—R", wherein at least one of the following applies:
  R' is independently selected from linear aliphatic divalent hydrocarbon group having 1-6 carbon atoms, in particular 1-4 carbon atoms, more in particular is at least one of ethylene or propylene, more in particular is ethylene; and/or
  R" is a linear alkyl with 6 to 30 carbon atoms, in particular with 9 to 25 carbon atoms, more in particular with 11 to 20 carbon atoms and even more in particular from 12 to 15 carbon atoms; and/or
  m is on average from 1 to 15, more in particular from 2 to 10, more in particular from 3 to 7, and more in particular m is on average 5.

In several particular embodiments, R' is independently selected from linear aliphatic divalent hydrocarbon group having from 1 to 4 carbon atoms, R" is a linear alkyl with 12 to 15 carbon atoms and m is on average from 3 to 7.

In several embodiments a polyether group as described therein is a bulky group as defined above, i.e. having a total number of carbon and heteroatoms of at least 20.

In several particular embodiments, an organomercaptosilane as described herein has at least one, in particular two, polyether group(s) of the formula $C_{13}H_{27}(OCH_2CH_2)_5O$—.

Generally, the organomercaptosilanes as described herein may of the formula (I)

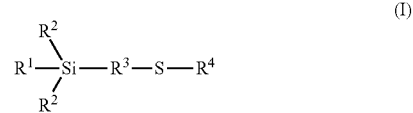

(I)

wherein $R^1$ and $R^2$ independently are the same or different and wherein at least one of the groups bound to the silicon atom ($R^1$ and $R^2$) is a bulky group and/or a polyether group as defined above;

$R^3$ is a branched or linear, saturated or unsaturated, aliphatic, aromatic or mixed aliphatic/aromatic divalent C1-C30 hydrocarbon group, in particular a C1-C15 hydrocarbon group, more in particular a C2-C10 hydrocarbon group, and even more in particular a C3-C5 hydrocarbon group; and $R^4$ is H, CN or (C=O)—$R^7$, where $R^7$ is a branched or linear, saturated or unsaturated, aliphatic, aromatic or mixed aliphatic/aromatic monovalent C1-C30 hydrocarbon group, in particular a C5-C30 hydrocarbon group, more in particular a C5-C20 hydrocarbon group, even more in particular a C7-C15 hydrocarbon group, and yet more in particular a C7-C11 hydrocarbon group.

In several embodiments, an organomercaptosilane as described herein may be an alkoxylated alkoxy organomercaptosilane of the formula (I)

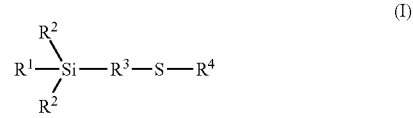

(I)

wherein
  $R^1$ is a polyether group defined as above;
  each $R^2$ independently is a group $R^1$, a C1-C12 alkyl or $R^5O$ group, where $R^5$ is H, methyl, ethyl, propyl, a C9-C30 branched or linear monovalent alkyl, alkenyl, aryl or aralkyl group or $(R^6)_3Si$ group where $R^6$ is a C1-C30 branched or linear, alkyl or alkenyl group;
  $R^3$ is a branched or linear, saturated or unsaturated, aliphatic, aromatic or mixed aliphatic/aromatic divalent C1-C30 hydrocarbon group, in particular a C1-C15 hydrocarbon group, more in particular a C2-C10 hydrocarbon group, and even more in particular a C3-C5 hydrocarbon group; and
  $R^4$ is H, CN or (C=O)—$R^7$, where $R^7$ is a branched or linear, saturated or unsaturated, aliphatic, aromatic or mixed aliphatic/aromatic monovalent C1-C30 hydrocarbon group, in particular a C5-C30 hydrocarbon group, more in particular a C5-C20 hydrocarbon group, even more in particular a C7-C15 hydrocarbon group, and yet more in particular a C7-C11 hydrocarbon group. In several particular embodiments, at least one of the groups bound to the silicon atom ($R^1$ and $R^2$) is a bulky group as defined above, i.e. having a total number of carbon atoms and heteroatoms of at least 20.

In several embodiments, the organomercaptosilane is an alkoxylated alkoxy organomercaptosilane of formula (I) wherein at least one of the following applies:
  $R^1$ is a polyether group (—O(R'—O)$_m$—R"), wherein R' is selected from linear aliphatic divalent hydrocarbon group having from 1 to 4 carbon atoms, R" is a linear alkyl with 12 to 15 carbon atoms and m is from 3 to 7; and/or R² independently is the group R¹ and/or is a R⁵O group, where R⁵ is independently selected from methyl, ethyl or propyl; and/or R³ is a C₃-C₅ hydrocarbon group; and/or R⁴ is hydrogen. In several particular embodiments, at least one of the groups bound to the silicon atom (R¹ and R²) is a bulky group as defined above, i.e. having a total number of carbon atoms and heteroatoms of at least 20.

In several embodiments, the organomercaptosilane is an alkoxylated alkoxy organomercaptosilane of formula (I) wherein:

R¹ is a polyether group (—O(R'—O)$_m$—R''), wherein R' is selected from linear aliphatic divalent hydrocarbon group having from 1 to 4 carbon atoms, R'' is a linear alkyl with 12 to 15 carbon atoms and m is from 3 to 7;

R² independently is the group R¹ and/or R² is a R⁵O group, where R⁵ is independently selected from methyl, ethyl or propyl;

R³ is a C₃-C₅ hydrocarbon group;

R⁴ is hydrogen; and optionally with the proviso that at least one of the groups bound to the silicon atom (R¹ and R²) is a bulky group as defined above, i.e. having a total number of carbon atoms and heteroatoms of at least 20.

In a particular embodiment the organomercaptosilane is an alkoxylated alkoxy organomercaptosilane having at least one polyether group and at least one ethoxy group bound to the silicon atom, and more in particular is an organomercaptosilane of formula

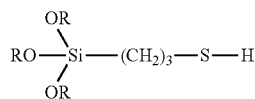

wherein RO— is ethoxy (CH₂H₅O—) or a polyether group as defined above.

In several embodiments the organomercaptosilane is an organomercaptosilane having at least two bulky polyether groups. Bulky organomercaptosilanes and alkoxylated alkoxy organomercaptosilanes as described herein, are commercially available and/or may be prepared by methods known in the art. In particular alkoxylated alkoxy organomercaptosilanes as described herein may be obtained as described in US 2006/0161015. An example of a commercially available bulky alkoxylated alkoxy organomercaptosilane is Si363 from Evonik.

Organomercaptosilanes as described herein are generally present in the rubber compositions in amounts from 0.05 to 75 phr, in particular from 0.1 to 60 phr, more in particular from 0.5 to 50 phr, even more in particular from 1 to 30 phr, and yet more in particular from 5 to 15 phr.

The amount of organomercaptosilane may be based on the amount of silica present in the rubber compositions as described herein. For instance, the amount of organomercaptosilane may be from 1 to 50 wt. % based on the total weight amount of silica present in the rubber composition, in particular from 5 to 30 wt. %, more in particular from 10 to 20 wt. %.

In several aspects, the instant invention relates to rubber compositions comprising (A) a rubber;

(B) 5-150 phr of silica;

(C) 0.05-75 phr of an organomercaptosilane having at a bulky group and/or a polyether group bound to the silicon atom; and (D) 0.001-75 phr of a rosin-containing material;

wherein phr is the weight parts of each component (B), (C) or (D) per 100 weight parts of rubber component (A).

The amounts of each of the components may be varied as indicated above when describing each of the different components, in particular rubber compositions may comprise any combination of the specific amounts mentioned above for each component.

A rubber composition as described herein may comprise additional ingredients other than rubber (A), silica (B), organo-mercaptosilane (C) and rosin-containing material (D).

The amount and type of additional components, if any, may depend on the final application of the rubber composition. Suitable additional components and amounts can be determined by a person skilled in the relevant art. Examples of additional components include, for instance, curing agents like 2,5-dimethyl-2,5-di(tert-butylperoxy)hexane (DTBPH) or dicumyl peroxide (DCP); curing or vulcanizing agents (e.g., sulphur, Vulkacit CS 1.5, Vulkacit D from Lanxess, and Rhenogran IS 60-75 from Rheinchemie); activators with maleimide groups like triallylcyanurate (TAC); peroxide retardants like derivatives from 4-tert-butylcatechol (TBC), methyl substituted amino alkylphenols and hydroperoxides; accelerators (e.g., 2-mercaptobenzothiazole (MBT), N-cyclohexyl-2-benzothiazylsulphenamide (CBS) or TMTD and sulphur); dispersing and processing aids like oils (e.g. TDAE, Vivatec™ 500 purchased from Hansen & Rosenthal); resins, plasticizers and pigments; fillers other than silica (such as those described above, e.g., Carbon Black); fatty acids (e.g., stearic acid); zinc oxide; waxes (e.g., Antilux™ 654 from Rheinchemie); antioxidants (e.g., IPPD, Vulkanox™ 4010 and 4020 from Lanxess); antiozonants (e.g., Durazone® 37 from SpecialChem); peptizing agents (e.g., diphenylguanidine, SDGP, Vulkacit™ IS6075 from Rheinchemie).

Several aspects of the instant invention also relate to methods of preparation of rubber compositions as described herein.

A method for preparing a rubber composition as described herein may comprise mixing:

(A) rubber;

(B) silica, (C) organomercaptosilane having a bulky group and/or a polyether group bound to the silicon atom and (D) rosin-containing material selected from rosin, dimerized rosin, hydrogenated rosin, disproportionated rosin, decarboxylated rosin and rosin ester.

Rubber compositions as described herein may be compounded or blended by using mixing equipments and procedures conventionally employed in the art.

The different components (A) to (D) and any other additional components may be mixed in any order.

What has been described above for the rubber composition, regarding the individual amounts of the different components and particular examples of each of the components, also applies to the method of preparation as described herein.

In several embodiments, an initial master batch may be prepared including part or all, generally all, of the rubber component (A) and an additional component selected from all or part of the silica component (B), and all or part of the organomercaptosilane component (C), all or part of the rosin-containing material component (D), and as well as other optional non-curing additives, such as processing oil, antioxidants and other additives commonly used in the art.

After the master batch is prepared, one or more optional remill stages can follow in which either no ingredients are added to the first mixture, or part of all of the remaining of silica component, organomercaptosilane component, rosin-containing material component, as well as other non-curing additives are added to the first mixture.

The master batch and any of the products obtained in the subsequent remill steps are commonly referred to as non-productive rubber compositions. Non-productive rubber lacks any curing agents (also referred to in the art as vulcanizing agents), and therefore no cross-linking will occur.

The next step may be the addition of curing agents to the mixture, to provide what is commonly known in the art as a productive rubber composition. This productive rubber composition will lead to a cross-linked rubber composition when subjected to curing (or vulcanizing) conditions. Herein, the cross-linked rubber composition will be referred to as cured rubber composition, which in the art is also known as vulcanized rubber composition. Accordingly, the method of preparation as described herein may further comprise curing said productive rubber compositions to provide a cured rubber composition.

A rubber may be pre-treated prior to being mixed with other components of the composition as described herein. For instance, a rubber used may be an oil extended rubber, i.e. rubber which has been treated with extender oil, or a solution master batch rubber in which the silica is pre-dispersed in the rubber. Such pre-treated rubbers are described in the literature and generally are commercially available. For instance, U.S. Pat. No. 7,312,271 describes the preparation of a solution masterbach rubber containing a diene elastomer in an organic solvent and a reinforcing silica filler dispersed therein. The article "Silica wet masterbatch" by Lightsey et. al. in the June volume of Rubber World 1998, describes a process that achieves essentially complete incorporation of silica during coagulation of traditional SBR or other latex. Suitable pre-treated rubbers include commercially available rubbers such as rubbers for shoe soles and for tire tread compounds for tires for trucks and passenger cars.

Silica may also be pre-treated prior to being mixed to other components of the rubber composition as described herein. Silica may be pre-treated with organomercaptosilane as described herein or may be pre-treated with a sulfur containing coupling agent other than organomercaptosilanes as described herein. Alternatively or additionally a silica may be pre-treated with other components commonly used in the art. Pre-treated silica is commercially available and/or may be prepared by known methods. For instance, U.S. Pat. No. 5,985,953, describes a compatibilized silica formed by the reaction of precipitated or fumed silica with organosilicon coupling compounds in aqueous suspension. U.S. Pat. No. 8,288,474 describes mercaptoalkylsilanes bound to silica and blocked mercaptoalkylsilanes bound to silica. Reference is also made to the publication "PPG's Agilon silicas 'eliminate silanisation and outgassing'" in the European Rubber Journal Vol. 191, No. 2: March/April 2009, page 12. Particular examples of commercially available pre-treated silicas include Ciptane™ 255LD, which is a mercaptosilane fixed to silica with virtually no trialkoxysilane present, Agilon™ 400 and Hi-Sil™ from Pittsburgh Paint and Glass (PPG) Industries.

When silica pre-treated with an organomercaptosilane as described herein is used, all or part of the organomercaptosilane of the rubber composition as described herein may be added to the rubber composition in the form of said pre-treated silica.

It has been found that rubber compositions as described herein have advantages both as uncured rubber compositions (non-productive and productive) and as cured rubber compositions.

Accordingly, in several embodiments the rubber compositions as described herein may be uncured rubber compositions or cured rubber compositions. In several particular embodiments uncured rubber compositions may be non-productive or productive uncured rubber compositions.

Advantageously, rubber compositions as described herein improve the manufacture and the properties of products comprising the same.

In particular, rosin-containing materials as described herein may be used to provide uncured rubber (non-productive and/or productive) with reduced Mooney viscosity and/or improved mechanical properties, when compared to similar uncured rubber compositions without rosin-containing materials as described herein. The term 'similar composition' means a comparison composition which is the same as the composition of the invention in all its components and as regards to the selection of materials and amounts thereof with the exception that the similar composition does not contain any of the rosin-containing material (i.e. component D) which is part in the composition of the invention.

Rubber compositions as described herein, in particular uncured rubber, may display a Mooney viscosity which is from 1 to 65% lower, in particular from 2.5 to 50% lower, more in particular from 5 to 25% lower, even more in particular from 7.5 to 15% lower than the Mooney viscosity obtained for a similar composition without rosin-containing materials. The Mooney viscosity may be determined according to procedures described in ASTM-D 1646-8911 (ISO 289). For uncured rubber the Mooney viscosity may be measured at 100° C.

Rosin-containing materials as described herein may also be used to provide rubber compositions, cured or uncured, in particular uncured, more in particular uncured productive rubber compositions (also known as green rubber), with improved tensile mechanical properties, when compared to similar rubber compositions without rosin-containing materials as described herein. The tensile mechanical properties of the rubber can be measured using standard procedures such as those described in ASTM 6746-10 for uncured rubber and ISO 37 for cured rubber. Parameters commonly used in the art which may be measured include the tensile strengths measured at 50% elongation (M50), at 200% elongation (M200) and at 300% elongation (M300); the tensile strength at break (TB); and the elongation at break (EB). The M200/M50 and the M300/M50 ratios give an idea of the reinforcement properties of the rubber composition.

Rubber compositions as described herein, in particular uncured rubber compositions, and more in particular uncured productive rubber compositions, may have a M200/M50 ratio which is from 1 to 50% higher, in particular from 2 to 35% higher, more in particular from 5 to 25% higher than the M200/M50 ratio of similar rubber compositions without rosin-containing materials as described herein.

Rubber compositions as described herein, uncured or cured, may have an elongation at break which is from 5 to 75% higher, in particular from 10 to 60% higher, more in particular from 25 to 50% higher than the elongation at break of similar rubber compositions without rosin-containing materials as described herein.

In particular, it has been found that the M200/M50 ratio of uncured rubber compositions as described herein and the elongation at break of cured and uncured rubber compositions as described herein may be improved without detrimentally affecting the tensile strength at break of the rubber composition.

Rosin-containing materials as described herein may also be used to provide rubber compositions which, in particular when cured, display a reduced tan δ at 60° C., when compared to similar cured rubber compositions without rosin-containing materials as described herein. As it is known in the art, the tan δ measured at 60° C. (60° C. tan δ) is the ratio between the dynamic mechanical loss and storage moduli and is a predictor of the rolling resistance of a rubber when used in tires. The lower the tan δ at 60° C. of the rubber, the lower the rolling resistance of the tire. Accordingly, rosin-containing materials as described herein may be used to provide cured rubber compositions with improved mechanical properties while having a negligible effect on rolling resistance. The dynamic viscoelastic properties of cured rubber compositions as described herein, and the 60° C. tan δ in particular, may be measured using standard methods known in the art, such as those described in Rubber World, Jan. 1, 2008, "Prediction of dynamic mechanical properties for tire tread compounds". To perform the measurements a Dynamic Mechanical Analyzer (DMA), such as the model DMA+450 manufactured by Metravib (France) may be used. Exemplary testing conditions, include for instance, a frequency of 10 Hz, and a strain of 0.1% from −80 to +80° C.

Rubber compositions as described herein, when cured, may have a 60° C. tan δ which is less than 20%, in particular less than 15%, more in particular less than 10% lower than the 60° C. tan δ of similar cured rubber compositions without rosin-containing materials when tested at a frequency of 10 Hz and a strain of 0.1% under shear mode.

Several aspects of the instant invention relate to the use of a rosin-containing material selected from rosin, dimerized rosin, hydrogenated rosin, disproportionated rosin, decarboxylated rosin and rosin ester (component D) in a rubber composition further comprising rubber (component A); silica (component B); and organomercaptosilane having a bulky group and/or a polyether group bound to the silicon atom as described above (component C) to obtain a rubber composition having, when the rubber composition is not cured, a reduced Mooney viscosity and/or improved mechanical properties when compared to a similar uncured rubber composition without component D; and/or to obtain a rubber composition having, when the rubber composition is cured, suitable rolling resistance when compared to a similar cured rubber composition without component D.

The methods of preparation as described herein may result in rubber compositions having the any of the properties described above for the rubber composition. What has been described above for the rubber composition, in particular regarding:

the individual amounts of the different components;
particular examples of each of the components; and
regarding the Mooney viscosity, mechanical properties (such as the M200/M50 ratio, the elongation at break and tensile strength at break) and the 60° C. tan δ, also applies to the rubber of the uses, methods of preparation and applications as described herein.

Rubber compositions as described herein may be used in numerous applications, such as tires and industrial rubber goods (e.g. conveyor belts and shoe soles).

In particular, rubber compositions as described herein, can be advantageously used in tires, and more in particular, in tire treads. Accordingly, in several aspects, the instant invention relates to a tire comprising a rubber composition as described herein and to a tire comprising a rubber composition as described herein in the tread of the tire.

A tire comprising rubber compositions as described herein may generally comprise other components in addition to rubber (A), silica (B), organomercaptosilane (C) and rosin-containing material (D). Examples of additional components include any of the additional components that may be present in the rubber composition as described above.

Other aspects of the invention also relate to a method for improving the mechanical properties of cured rubber compositions, in particular improving the mechanical properties of a tire, wherein the tire comprises a rubber composition as described herein.

In particular, the instant invention relates to the use of a rosin-containing material selected from rosin, dimerized rosin, hydrogenated rosin, disproportionated rosin, decarboxylated rosin and rosin ester (component D) to obtain a rubber composition having, when the rubber composition is cured, improved mechanical properties (e.g., tensile strength), wherein the rubber composition further comprises rubber (component A);
silica (component B); and
organomercaptosilane having a bulky group and/or a polyether group bound to the silicon atom as described above (component C). In a particular embodiment the rubber composition is comprised in a tire.

The invention is further illustrated with the following examples, without being limited thereto or thereby.

EXAMPLES

Preparation of Rubber Compositions

Rubber compositions prepared with the formulations as detailed in Table 1.

The rubber compositions prepared differed in the amount of rosin-containing material used (component D) in table 1) and in the amount of mineral oil:

TABLE 1

| | Comp. Ex. 1 | Ex. 2 | Ex. 3 | Ex. 4 | Ex. 5-10 |
|---|---|---|---|---|---|
| Component (PHR) | | | | | |
| (A) Rubber | 100.0 | 100.0 | 100.0 | 100.0 | 100.0 |
| (B) Silica | 80.0 | 80.0 | 80.0 | 80.0 | 80.0 |
| (C) Organomercaptosilane | 10.0 | 10.0 | 10.0 | 10.0 | 10.0 |
| (D) Rosin-containing material | 0 | 1.0 | 2.5 | 4.0 | 1.0 |
| Additional components (PHR) | | | | | |
| Mineral Oil | 20.0 | 19.0 | 17.5 | 16.0 | 20.0 |
| Vulcanization package | 9.5 | 9.5 | 9.5 | 9.5 | 9.5 |
| Carbon black | 10.0 | 10.0 | 10.0 | 10.0 | 10.0 |
| Antioxidants | 3.5 | 3.5 | 3.5 | 3.5 | 3.5 |
| Wax | 1.0 | 1.0 | 1.0 | 1.0 | 1.0 |

The rubber used consisted of a mixture of rubbers comprising 70 parts of Solution Styrene Butadiene Rubber (S-SBR) (Buna VSL VP PBR4041™, obtained from Lanxess), 30 parts of Butadiene Rubber (BR) (Buna CB24™, obtained from Lanxess).

The silica was precipitated silica (Ultrasil™ 7000GR, obtained from Evonik).

In Examples 2-5, the rosin-containing material was a Tall Oil Rosin (Sylvaros™ 85 rosin available from Arizona Chemical Company) having a softening point 63° C. and an acid number of 168 mg KOH/g.

In Example 6, the rosin-containing material was gum Rosin (Sylvatraxx™ 1001 rosin available from Arizona Chemical Company) having a softening point of 83° C. and an acid number of 168 mg KOH/g.

In Example 7, the rosin-containing material was dimerized rosin (ILREZ™ rosin available from Ildes Kimya Ltd.) having an acid number of 160 mg KOH/g and a softening point of 100° C.

In Example 8, the rosin-containing material was disproportionated rosin (Abieta™ DR836A rosin available from Arizona Chemical Company) having an acid number of 155 mg KOH/g and a softening point of 60° C.

In Example 9, the rosin-containing material was decarboxylated rosin (Sylvaros™ 85 rosin available from Arizona Chemical Company) having an acid number from of 56 mg KOH/g and a Brookfield viscosity of 179 cPs at 50° C. with spindle 21.

In Example 10, the rosin-containing material was rosin ester (Sylvalite™ RE105XL rosin ester available from Arizona Chemical Company) having an acid number of 4 mg KOH/g and a softening point of 102° C.

The organomercaptosilane was the alkoxylated alkoxy propylmercaptosilane Si363 purchased from Evonik.

The carbon black (CB) was Corax™ N234, purchased from Orion Engineered Carbons.

The mineral oil Treated Distillate Aromatic Extract (TDAE, Vivatec™ 500 purchased from Hansen & Rosenthal).

The antioxidants used were 1 phr of N-isopropyl-p-phenylenediamine (IPPD, Vulkanox™ 4010, purchased from Lanxess) 2 phr of N-(1,3 dimethylbutyl)-N' phenyl-p-phenylenediamine (6PPD, Vulkanox™ 4020 purchased from Lanxess) and 0.5 phr of 2,2,4-trimethyl-1,2-dihydroquinoline (TMQ, Vulkanox™ HS purchased from Lanxess).

The wax was Antilux™ 654, purchased from Rheinchemie, Germany.

The vulcanization package consisted of 3 phr of zinc oxide (Zinc Oxide Red Seal™ purchased from Grillo), 1 phr of stearic acid, 1.5 phr of N-cyclohexyl-2-benzothiazole sulfenamide (CBS, Rhenogran® CBS-80 purchased from RheinChemie, Germany), 2 phr of diphenylguanidine (SDPG, Rhenogran® DPG-80, purchased from RheinChemie, Germany) and 2 phr of sulphur (Rhenogran® IS 60-75, purchased from RheinChemie, Germany).

Rubber compositions with different amounts of Rosin as indicated in Table 1 were prepared by mixing in a lab-scale Brabender type internal mixer (Haake Rheomix OS & Polylab OS from Thermo Scientific Mixer) using a four step mixing protocol.

In the first step the rubbers SBR and BR were introduced to the mixer and heated at 50° C. and 100 rpm. After 0.5 minutes, the Rosin-containing material (0-4.0 phr), 21.2 phr of silica, 10.0 phr Carbon Black, 4.2-5.3 phr of the mineral oil (TDAE) and stearic acid were added to the rubber.

The mixture was mixed at 100 RPM for 0.5 minutes and further 18.6 phr of silica, 3.7-4.6 phr of the mineral oil (TDAE) and 6.67 phr of organomercaptosilane Si363 were added to the mixture.

The mixture was mixed at 100 RPM for 0.5 minutes and further 13.3 phr of silica, 2.7-3.3 phi of mineral oil (TDAE) and zinc oxide were added to the mixture.

The speed of the rotor was set to allow to reach a temperature of 153° C. When the temperature was reached the mixture was dumped out of the mixer and allowed to cool at room temperature, to provide a first non-productive rubber mixture (STAGE 1 rubber).

In the second step, the STAGE 1 rubber was brought back into the mixer and was set to 100 RPM. After 0.5 minutes, 13.5 phr of silica, 3.33 phr of organomercaptosilane Si363, antioxidants 3.5 phr (Vulkanox 4010 1 phr, Vulkanox 4020 2 phr, Vulkanox HS 0.5 phr) and wax 1.0 phr (Antilux 654) were added to the mixture. After 0.5 minutes 13.5 phr of silica was added to the mixture. The speed of the rotor was then set to allow a temperature of 146° C. to be reached. When the temperature was reached the mixture was dumped out of the mixer and allowed to cool at room temperature, to provide a second non-productive rubber mixture (STAGE 2 rubber).

In the third step, the STAGE 2 rubber was brought back into the mixer and was set to 100 RPM. The speed of the rotor was set to allow the mixture to reach a temperature of 143° C. When the temperature was reached the mixture was dumped out of the mixer and allowed to cool at room temperature, to provide a third non-productive rubber mixture (STAGE 3 rubber).

In the fourth step, the STAGE 3 rubber was brought back into the mixer and the rotor was set to 80 RPM. The vulcanization package 5.5 phr (Rhenogran CBS-80 1.5 phr, Rhenogran DPG-80 2 phr, Rhenogran IS 60-75 2 phr) was added to the mixture. The speed of the rotor was set to allow the mixture to reach a temperature of 100° C. When the temperature was reached the mixture was dumped out of the mixer and allowed to cool at room temperature, to provide a final productive mixture (FINAL STAGE).

The final productive mixtures were cured at 160° C. for 15 minutes used for dynamic and tensile mechanical tests.

Performance of Rubber Compositions

As explained in more detail below, rubber compositions of examples 1-5, at different stages of production, were tested for different properties including Mooney viscosity, Tensile mechanical properties and Dynamic mechanical viscoelastic properties.

Mooney Viscosity

The large rotor Mooney viscosity of the rubber compositions of examples 1-10 was determined at STAGE 1 according to procedures described in ASTM-D 1646-8911 (ISO 289). The test was performed using a large rotor at 100° C. The sample was preheated at the test temperature for 1 min before the rotor started and then the Mooney viscosity (ML(1+4) at 100° C.) was recorded as the torque after the rotor had rotated for 4 min at 2 rpm (average shear rate about 1.6 s$^{-1}$). The results are shown in Table 2a and Table 2b under ML(1+4) at 100° C. The viscosity of the final productive rubber mixtures was characterized by measuring torque before its build up during the curing process (ML 160° C.). This was conducted by recording the minimum torque using a Prescott Rheo-Line Moving Die Rheometer for monitoring the curing process according to the ISO 6502 or ASTM D5289 procedure. The testing conditions used were a frequency of 1.67 Hz and a strain of 7% at 160° C. The minimum torque recorded is shown in Table 2a and Table 2b under ML 160° C.

TABLE 2a

| | Comparative Example 1 | Example 2 | Example 3 | Example 4 |
|---|---|---|---|---|
| ML (1 + 4) at 100° C. (in Mooney units) | | | | |
| STAGE 1 rubber | 269.2(*) | 145.59 | 108.64 | 93.39 |
| ML 160° C. (in dNm) | | | | |
| FINAL STAGE rubber | 4.37 | 3.99 | 3.09 | 2.47 |

(*)reported numbers above 250 MU indicate too high torque and the test was not completed As it can be seen in Table 2a the Mooney viscosity (ML(1+4) at 100° C.) of the uncured rubber mixtures comprising rosin (STAGE 1 rubber of examples 2 to 4) are greatly diminished when compared to uncured mixtures of rubber compositions which do not comprise rosin (comparative example 1).

As it can also be seen from Table 2a the Minimum torque (ML) is also reduced in the presence of rosin acid (examples 2-4).

TABLE 2b

| | Comparative example 1 | Example 5 | Example 6 | Example 7 | Example 8 | Example 9 | Example 10 |
|---|---|---|---|---|---|---|---|
| ML (1 + 4) at 100° C. (in Mooney Units) | | | | | | | |
| STAGE 1 rubber | 269.2(*) | 136.2 | 166.2 | 146.4 | 167.6 | 188.2 | 256.8(*) |
| ML 160° C. (in dNm) | | | | | | | |
| FINAL STAGE rubber | 4.37 | 3.16 | 3.61 | 3.37 | 3.26 | 3.33 | 3.86 |

(*)reported numbers above 250 MU indicate too high torque and the test was not completed As it can be seen in Table 2b the Mooney viscosity (ML(1+4) at 100° C.) of the uncured rubber mixtures comprising rosin (STAGE 1 rubber of examples 5 to 10) are diminished when compared to uncured mixtures of rubber compositions which do not comprise rosin (comparative example 1).

As it can also be seen from Table 2b the Minimum torque (ML) is also reduced in the presence of rosin-containing material (examples 5-10).

The reduction of the viscosity at both 100° C. and 160° C. means that the production of products derived from rubber compositions comprising both rosin acid and an organomercaptosilane can be significantly improved.

In particular, the lower ML(1+4) at 100° C. in the nonproductive stocks (STAGE 1) along with the better green mechanical properties in the final stocks (FINAL STAGE) will facilitate the better rubber processing including ease for handling and the continuation of the mixing process which will greatly increase the plant productivity and the production throughput.

Tensile Mechanical Properties

The tensile mechanical properties of the final productive rubber mixture (uncured, also known as green rubber) were measured using the standard procedure described in ASTM 6746-10. The uncured green mechanical properties were measured at 21° C. Force readings are expressed as engineering-stresses by reference to the original cross-sectional area of the test piece.

The test specimens of uncured rubber compositions used for the measurement of the tensile strength, had a rectangular shape with 10 cm in length, 10 mm in width and 2.5 mm in thickness. The test specimen was heated at 100° C. for 5 minutes before testing at 21° C. The test speed was 100 mm/min and the test results are the mean of 3 measurements. The green tensile properties are important properties relating to processes such as calendaring, extrusions, and tire building. These properties are important for rubber compounds that are used in tire construction. Tires, and in particular radial tires, built with a rubber compound that has poor green tensile properties may fail, e.g., during extrusion before cure.

Tensile strengths were measured at 50% elongation (M50) and at 200% elongation (M200). The tensile strength at break was also measured, which corresponded to the applied load at which test specimen broke (tensile strength at break, TB). The elongation at break (EB) and area under the stress-strain curve (tensile toughness) were also recorded. The results are shown in table 3a and table 3b. The M200/M50 ratio is also indicated.

TABLE 3a

| | Comparative Example 1 | Example 2 | Example 3 | Example 4 |
|---|---|---|---|---|
| M50 (MPa) | 0.289 | 0.244 | 0.252 | 0.216 |
| M200 (MPa) | 0.372 | 0.332 | 0.366 | 0.348 |
| M200/M50 | 1.287 | 1.361 | 1.451 | 1.606 |
| TB (MPa) | 0.375 | 0.342 | 0.370 | 0.376 |
| EB (%) | 237 | 335 | 342 | 344 |

As can be seen from table 3a the elongation at break (EB) is significantly increased in the presence of TOR. The M50 and the M200 are slightly reduced in the presence of TOR. More significantly the M200 over M50 ratio is increased. The increase of the M200/M50 indicates an increase of reinforcement properties in the rubber composition. This means that the integrity of the rubber composition, the dispersion of the filler (in this case silica) and the interaction between the rubber and the silica are improved.

On the other hand the tensile strength, is not detrimentally affected by the presence of rosin (it remains essentially constant).

TABLE 3b

|  | Comparative Example 1 | Example 5 | Example 6 | Example 7 | Example 8 | Example 9 | Example 10 |
|---|---|---|---|---|---|---|---|
| M50 (MPa) | 0.289 | 0.29 | 0.284 | 0.29 | 0.329 | 0.288 | 0.349 |
| M200 (MPa) | 0.372 | 0.253 | 0.312 | 0.278 | 0.328 | 0.264 | 0.395 |
| M200/M50 | 1.287 | 0.873 | 1.098 | 0.958 | 0.998 | 0.917 | 1.131 |
| TB (MPa) | 0.375 | 0.29 | 0.313 | 0.291 | 0.338 | 0.293 | 0.405 |
| EB (%) | 237 | 232 | 374 | 291 | 264 | 182 | 200 |

As can be seen from table 3b the elongation at break (EB) is significantly increased in the presence of GUM rosin. The tensile strength is significantly improved for rosin ester.

The tensile mechanical properties of the cured rubber were measured using the standard procedure described in ISO 37 at 21° C. The test specimens of rubber cured at 160° C. for 15 min were dumbbell shape cuttings according to ISO-37 type 1 die cutter, with 2.5 mm in thickness and 6 mm in width. A specific gauge length of 25 mm was used for the tensile test.

TABLE 3c

|  | Comparative Example 1 | Example 2 | Example 3 | Example 4 |
|---|---|---|---|---|
| M50 (MPa) | 1.227 | 1.148 | 1.090 | 1.049 |
| M300 (MPa) | 8.388 | 6.377 | 5.978 | 6.561 |
| M300/M50 | 6.839 | 5.552 | 5.482 | 6.258 |
| TB (MPa) | 17.41 | 18.15 | 18.03 | 18.73 |
| EB (%) | 505 | 640 | 664 | 646 |

As can be seen from table 3c the elongation at break (EB) is significantly increased in the presence of TOR. The M50 and the M300 are slightly reduced in the presence of TOR. More significantly the M300 over M50 ratio is decreased. The decrease of the M300/M50 indicates a decrease of reinforcement properties of in the rubber composition. This means that the integrity of the rubber composition, the dispersion of the filler (in this case silica) and the interaction between the rubber and the silica are slightly reduced.

On the other hand the tensile strength, is not detrimentally affected by the presence of rosin (it remains essentially constant).

TABLE 3d

|  | Comparative Example 1 | Example 5 | Example 6 | Example 7 | Example 8 | Example 9 | Example 10 |
|---|---|---|---|---|---|---|---|
| M50 (MPa) | 1.227 | 1.273 | 1.147 | 1.31 | 1.318 | 1.271 | 1.38 |
| M300 (MPa) | 8.388 | 7.423 | 8.136 | 8.058 | 8.794 | 7.87 | 9.839 |
| M300/M50 | 6.839 | 5.83 | 7.092 | 6.151 | 6.674 | 6.192 | 7.132 |
| TB (MPa) | 17.41 | 18.9 | 18.37 | 18.7 | 18.52 | 19.43 | 17.4 |
| EB (%) | 505 | 561 | 502 | 530 | 479 | 553 | 447 |

As can be seen from table 3d the elongation at break (EB) is increased or constant in the presence of rosin, dimerized rosin and dicarboxylated rosin. The addition of rosin (example 5-10) has limited effect on M50 or M300.

The tensile strength is improved in the presence of rosin, dimerized rosin, disproportionated rosin and dicarboxylated rosin. The tensile strength remains constant in the presence of rosin ester.

Dynamic Mechanical Viscoelastic Property Measurements

The dynamic viscoelastic properties of cured stocks were obtained from temperature sweep experiments using the Dynamic Mechanical Analyzer model DMA+450 manufactured by Metravib, France.

The test was conducted by attaching a test piece of cured rubber composition attached to the sample holder with the planar shear (double simple shear) configuration in the shear mode. The testing conditions were: a frequency of 10 Hz, and a strain of 0.1% from −80 to +80° C. Rheological data such as storage modulus (G') and loss modulus (G"), tan δ (the ratio between G" and G'), dynamic strain and force, shear rate, viscosity, and torque were recorded.

The tan δ values measured at different temperatures are usually used to predict several tire performances. For example, tire rolling resistance and wet traction are both dictated by the energy losses from the tire service, but encompass different deformation magnitudes and frequencies. These energy losses can be conveniently measured by the dynamic viscoelastic properties of the rubber in a frequency range of 1-10 Hz with strain levels selected as a function of temperature from −100° C. to 100° C. Thus, the use of the tan δ at 60° C. as a predictor of rolling resistance is widely practiced in the tire industry. The 60° C. tan δ of rubber compositions of comparative example 1 and examples 2-4 was measured at a frequency of 10 Hz and a strain of 0.1% under shear mode.

TABLE 4a

|  | Comparative Example 1 | Example 2 | Example 3 | Example 4 |
|---|---|---|---|---|
| 60° C. tan δ | 0.175 | 0.208 | 0.218 | 0.222 |

As it can be seen from table 4a the tan δ at 60° C. is slightly increased in the presence of TOR. This indicates that the presence of rosin has a negligible effect on rolling resistance of tires TABLE 4b

|  | Comparative Example 1 | Example 5 | Example 6 | Example 7 | Example 8 | Example 9 | Example 10 |
|---|---|---|---|---|---|---|---|
| 60° C. tan δ | 0.175 | 0.185 | 0.183 | 0.18 | 0.174 | 0.175 | 0.163 |

As it can be seen from table 4b the tan δ at 60° C. is slightly increased in the presence of TOR, GUM and dimerized rosin. The tan δ at 60° C. is slightly decreased in the presence of rosin ester and is stable in the presence of disproportionated and decarboxylated rosin. This indicates that the presence of rosin has a negligible effect on rolling resistance of tires.

The invention claimed is:

1. A rubber composition comprising
   (A) a rubber;
   (B) silica;
   (C) an organomercaptosilane having a bulky group and/or a polyether group bound to the silicon atom and
   (D) a rosin-containing material comprising at least one rosin compound and derivatives thereof selected from at least one of rosin having a softening point from 40 to 170° C. and having an acid number from 125 to 190 mg KOH/g, dimerized rosin having a softening point from 40 to 170° C., hydrogenated rosin having a softening point from 40 to 170° C. and having an acid number from 125 to 190 mg KOH/g, disproportionated rosin having a softening point from 40 to 170° C. and having an acid number from 125 to 190 mg KOH/g, decarboxylated rosin having a softening point from 40 to 170° C., and rosin ester having a softening point of less than 120° C. and having an acid number from greater than 20 to 190 mg KOH/g,
   wherein the bulky group has a total number of carbon atoms and, if any, heteroatoms of at least 20, and
   wherein the rubber composition, when not cured, has a M200/M50 ratio of tensile strength measured at 200% elongation over tensile strength measured at 50% elongation from 1 to 50% higher than the M200/M50 ratio of similar rubber compositions without a rosin-containing material.

2. The rubber composition of claim 1, wherein the rosin containing-material has an acid number 0.5 to 210 mg KOH/g.

3. The rubber composition of claim 1, wherein the rosin-containing material is a rosin or derivative thereof selected from tall oil rosin, gum rosin, and wood rosin.

4. The rubber composition of claim 1, wherein the organomercaptosilane has both a bulky group and a polyether group bound to the silicon atom.

5. The rubber composition of claim 1, wherein the bulky group has a total number of carbon atoms and, if any, heteroatoms of at least 22.

6. The rubber composition of claim 1, wherein the bulky group is a R— group or a RO— group, wherein R is branched or linear monovalent or divalent alkyl, alkenyl, aryl or aralkyl group; and, optionally, R is substituted.

7. The rubber composition of claim 1, wherein the polyether group is of formula —O(R'—O)$_m$—R", wherein R' is identical or different when m>1 and is a branched or linear, saturated or unsaturated, aliphatic divalent C1-C30 hydrocarbon group;
m is on average 1 to 30; and
R" is an unsubstituted or substituted branched or linear monovalent alkyl, alkenyl, aryl or aralkyl group having at least 7 carbon atoms.

8. The rubber composition of claim 7, wherein
R' is selected from linear aliphatic divalent hydrocarbon group having from 1 to 4 carbon atoms;
m is from 3 to 7; and
R" is a linear alkyl with 12 to 15 carbon atoms.

9. The rubber composition of claim 1, wherein the polyether group has a total number of carbon atoms and heteroatoms of at least 20.

10. The rubber composition of claim 1, wherein the organomercaptosilane is an organomercaptosilane of formula (I)

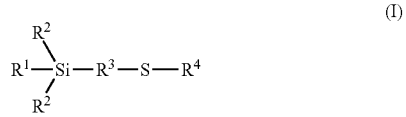

(I)

wherein $R^1$ and $R^2$ independently are the same or different and wherein at least one of $R^1$ and $R^2$ is a bulky group and/or a polyether group as defined in any one of claims 1 and 5-9;
$R^3$ is a branched or linear, saturated or unsaturated, aliphatic, aromatic or mixed aliphatic/aromatic divalent C1-C30 hydrocarbon group; and
$R^4$ is H, CN or (C=O)—$R^7$, where $R^7$ is a branched or linear, saturated or unsaturated, aliphatic, aromatic or mixed aliphatic/aromatic monovalent C1-C30 hydrocarbon group.

11. The rubber composition of claim 10, wherein
$R^1$ is a polyether group; and
each $R^2$ is independently selected from $R^1$, a C1-C12 alkyl or a $R^5$O group, where $R^5$ is H, methyl, ethyl, propyl, a C9-C30 branched or linear monovalent alkyl, alkenyl, aryl or aralkyl group or $(R^6)_3$Si group where $R^6$ is a C1-C30 branched or linear, alkyl or alkenyl group.

12. The rubber composition of claim 11, wherein
$R^2$ is the group $R^1$ and/or a $R^5$O group, where $R^5$ is independently selected from methyl, ethyl and propyl;
$R^3$ is a $C_3$-C5 hydrocarbon group; and
$R^4$ is hydrogen.

13. The rubber composition of claim 12, wherein the organomercaptosilane has a polyether group and an ethoxy group bound to the silicon atom and is of formula

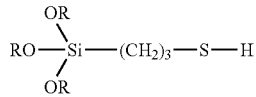

wherein RO— is ethoxy ($CH_2H_5O$—) or the polyether group.

14. The rubber composition of claim 1, wherein the rubber (A) is selected from at least one of styrene/butadiene copolymer (SBR), polybutadiene (BR), natural rubber, polyisoprene, butadiene/isoprene copolymer (IIR), styrene/isoprene/butadiene terpolymer (SIBR), and isoprene/styrene copolymer.

15. The rubber composition of claim 1, wherein the amount of the organomercaptosilane (C) is from 0.05 to 75 phr, wherein phr is the weight parts of organomercaptosilane per 100 weight parts of rubber component (A).

16. The rubber composition of claim 1, wherein the amount of rosin-containing material (D) is from 0.001 to 75 phr, wherein phr is the weight parts of rosin-containing material per 100 weight parts of rubber component (A).

17. The rubber composition of claim 1, wherein the amount of silica (B) is from 5 to 150 phr, wherein phr is the weight parts of silica per 100 weight parts of rubber component (A).

18. The rubber composition of claim 1 comprising 5-150 phr of silica (B), 0.05-75 phr of the organomercaptosilane (C) and 0.001-75 phr of the rosin-containing material (D), wherein phr is the weight parts of each component (B), (C) or (D) per 100 weight parts of rubber component (A).

19. The rubber composition of claim 1, having, when the rubber composition is in STAGE 1, a Mooney viscosity from 1 to 75% lower, than the Mooney viscosity of a similar rubber composition without a rosin-containing material.

20. The rubber composition of claim 1, having an elongation at break from 5 to 75% higher than the elongation at break of similar rubber compositions without a rosin-containing material.

21. The rubber composition of claim 1, having, when the rubber composition is cured, a tan δ at 60° C. less than 10% higher than the tan δ at 60° C. of a similar rubber composition without rosin-containing materials, the tan δ at 60° C. being measured at a frequency of 10 Hz and a strain of 0.1% under shear mode.

22. A tire comprising the rubber composition of claim 1.

23. A rubber composition comprising a rosin-containing material selected from rosin having a softening point from 40 to 170° C. and having an acid number from 125 to 190 mg KOH/g, dimerized rosin having a softening point from 40 to 170° C., hydrogenated rosin having a softening point from 40 to 170° C. and having an acid number from 125 to 190 mg KOH/g, disproportionated rosin having a softening point from 40 to 170° C. and having an acid number from 125 to 190 mg KOH/g, decarboxylated rosin having a softening point from 40 to 170° C., and rosin ester having a softening point of less than 120° C. and having an acid number from greater than 20 to 190 mg KOH/g (component D), further comprising:

a rubber (component A);
silica (component B); and
an organomercaptosilane having a bulky group and/or a polyether group bound to the silicon atom (component C), wherein the bulky group has a total number of carbon atoms and, if any, heteroatoms of at least 20, and
wherein the rubber composition has, when not cured, a Mooney viscosity from 1 to 75% lower than a similar uncured rubber composition without component D.

24. A method for preparing a rubber composition according to claim 1 comprising mixing:
(A) a rubber;
(B) silica;
(C) an organomercaptosilane having a bulky group and/or a polyether group bound to the silicon atom, wherein the bulky group has a total number of carbon atoms and, if any, heteroatoms of at least 20; and
(D) a rosin-containing material selected from rosin having a softening point from 40 to 170° C. and having an acid number from 125 to 190 mg KOH/g, dimerized rosin having a softening point from 40 to 170° C., hydrogenated rosin having a softening point from 40 to 170° C. and having an acid number from 125 to 190 mg KOH/g, disproportionated rosin having a softening point from 40 to 170° C. and having an acid number from 125 to 190 mg KOH/g, decarboxylated rosin having a softening point from 40 to 170° C., and rosin ester having a softening point of less than 120° C. and having an acid number from greater than 20 to 190 mg KOH/g.

25. The rubber composition of claim 1, wherein the rosin containing-material is selected from rosin having an acid number from 125 to 190 mg KOH/g, dimerized rosin having an acid number from 120 to 190 mg KOH/g, hydrogenated rosin having an acid number from 140 to 180 mg KOH/g, disproportionated rosin having an acid number from 130 to 180 mg KOH/g, and decarboxylated rosin having an acid number from 35 to 100 mg KOH/g.

* * * * *